(12) United States Patent
Hobbs et al.

(10) Patent No.: US 6,553,639 B2
(45) Date of Patent: Apr. 29, 2003

(54) METHOD OF MANUFACTURING SEALS

(75) Inventors: John Hobbs, Bristol (GB); David W Richards, Bristol (GB)

(73) Assignee: Rolls-Royce, plc, London (GB)

( * ) Notice: Subject to any disclaimer, the term of this patent is extended or adjusted under 35 U.S.C. 154(b) by 145 days.

(21) Appl. No.: 09/906,758

(22) Filed: Jul. 18, 2001

(65) Prior Publication Data

US 2002/0014009 A1 Feb. 7, 2002

(30) Foreign Application Priority Data

Jul. 18, 2000 (GB) .............................................. 0017559

(51) Int. Cl.$^7$ ................................................ B23P 17/00
(52) U.S. Cl. ..................... 29/417; 29/888.3; 277/636; 277/527; 277/528; 277/637; 277/644; 277/530
(58) Field of Search ................. 29/417, 888.3, 29/DIG. 3; 277/636, 200, 196, 213, 527, 528, 529, 530, 637, 644; 72/59, 370.19

(56) References Cited

U.S. PATENT DOCUMENTS

| | | | | |
|---|---|---|---|---|
| 414,882 A | * | 11/1889 | Guibal ........................ | 428/129 |
| 1,601,381 A | * | 9/1926 | Thompson ................... | 277/528 |
| 2,251,211 A | * | 7/1941 | Armstrong ................... | 277/541 |
| 2,819,919 A | * | 1/1958 | Pearce et al. ................ | 277/541 |
| 4,068,853 A | * | 1/1978 | Schnitzler ................... | 277/308 |
| 4,875,692 A | * | 10/1989 | Connor ....................... | 277/636 |
| 5,071,138 A | | 12/1991 | Mackay et al. | |
| 5,163,691 A | | 11/1992 | Lederman | |

\* cited by examiner

Primary Examiner—Gregory Vidovich
Assistant Examiner—Stephen Kenny
(74) Attorney, Agent, or Firm—Oliff & Berridge, PLC

(57) ABSTRACT

A method of manufacturing a leaf seal for use between rotating components comprises forming corrugations within a metallic strip and feeding the corrugated strip into a seal guide. The corrugated strip is then pressed into the guide by an angled ram such that the corrugations lie at an acute angle to the perpendicular axis. The strip is then secured in a seal carrier, the free ends of the corrugations thus forming the angled sealing leaves of a leaf seal.

11 Claims, 3 Drawing Sheets

METHOD OF MANUFACTURING SEALS

This invention relates to a method of manufacturing seals and in particular to a method of manufacturing leaf seals.

Leaf seals are well known as a means of sealing a clearance gap between two rotating components such as the shafts of a gas turbine engine or a rotatable shaft and the housing surrounding the shaft. They may also be used as static seals.

The shafts of a gas turbine engine rotate at extremely high speeds and are also exposed to hot pressurised gases. As such the seals and their manufacturing process are required to be of a high quality.

Leaf seals, also known as foil seals, comprises a number of thin, resilient but flexible strips packed densely together and aligned, at an angle to the shaft axis, in the sealing direction. One end of the strips or leafs, either the radially inner or outer ends, are held within a housing with their other ends resting on the shaft so that the strips extend across the seal gap. One such seal design is disclosed in EP 0,933,567. The resilient ships of leaves of the seal are axially stiff and do not bend in the axial sealing direction, hence being sometimes preferable to brush seals.

Leaf seals are normally manufactured by producing a number of individual leafs or strips and stacking them together, face to face, in a controlled manner and then arranging them in an appropriately sized ring. However it is difficult to manufacture these seals in quantity as the manufacture of individual leaves and then stacking in a controlled manner is time consuming and costly.

It is an aim of this invention, therefore, to provide an improved method of manufacture of leaf seals which also alleviates the aforementioned problems.

According to the present invention there is provided a method of manufacturing a leaf seal suitable for use within a clearance between two components comprising the steps of providing a strip of seal material, forming corrugations within said strip, feeding said strip into guide means, pressing said corrugated strip into said guide means by angled ram means such that the corrugations lie at an acute angle to the perpendicular axis, securing said corrugated strip in a seal carrier, and cutting the free ends of the corrugations thus forming angled leaves of a leaf seal.

An embodiment of the invention will now be described with reference to the accompanying drawings in which.

Figure 1:
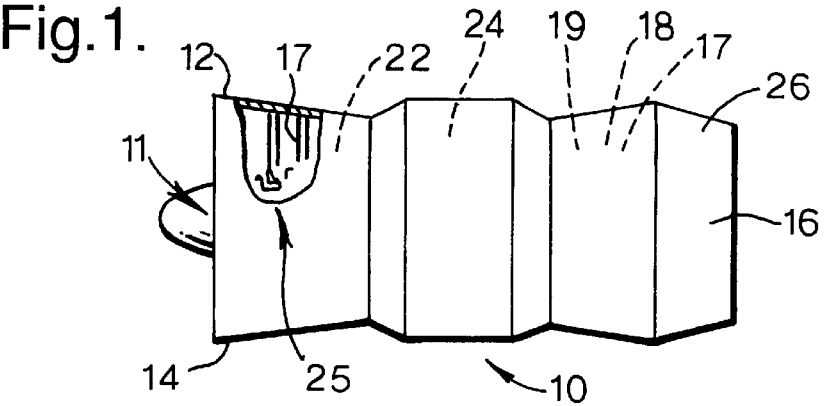
FIG. 1 is a schematic sectioned side view of a ducted fan gas turbine engine.

With reference to FIG. 1 a ducted fan gas turbine engine generally indicated at 10 is of mainly conventional construction. It comprises a core engine which functions in the conventional manner to drive a propulsive fan 12 mounted at the upstream end of the core engine (the term upstream as used herein is with respect to the general direction of gas flow through the engine 10 that is, from left to right as viewed in FIG. 1). The propulsive fan 12 comprises an annular array of radially extending aerofoil blades 14 and is positioned within a fan casing which is supported from the core engine by an annular array of generally radially extending outlet guide vanes 18. The gas turbine engine 10 has a longitudinal axis 16 about which its major rotational parts rotate.

The fan 12 is mounted on a shaft which is coaxial with the engine longitudinal axis 16 and which is driven in the conventional manner by the low pressure turbine 17 of the core engine.

The first shaft extends almost the whole length of the ducted fan gas turbine engine 10 to interconnect the fan 12 and the low pressure turbine 17 of the core engine. The first shaft is supported from the remainder of the core engine by a number of bearings.

The gas turbine engine works in the conventional manner so that air entering the intake is accelerated by the fan 12 to produce airflow into the intermediate pressure compressor 20. The intermediate pressure compressor 20 compressors the airflow directed into it before delivering the air to the high pressure compressor 22 where further compression takes place.

The compressed air exhausted from the high pressure compressor 22 is directed into the combustion equipment 24 where it is mixed with fuel and the mixture combusted. The resultant hot combustion products then expand through and thereby drive the high 17, intermediate 18 and low 19 pressure turbines before being exhausted through the nozzle 26 to provide additional propulsive thrust. The high 19, intermediate 18 and low 17 pressure turbines respectively drive the high 22 and intermediate 20 pressure compressors and the fan 12 by suitable interconnecting shafts.

A seal 30 manufactured according to the present invention may be positioned between the fan shaft 12a and the adjacent stator structure 27. The seal may be positioned in any required location between rotating shafts or a rotating shaft and associated stationary structure in a gas turbine engine, subject to its material limitations. This is illustrated diagrammatically in FIG. 1 at 28 and in FIG. 2.

Figure 2:
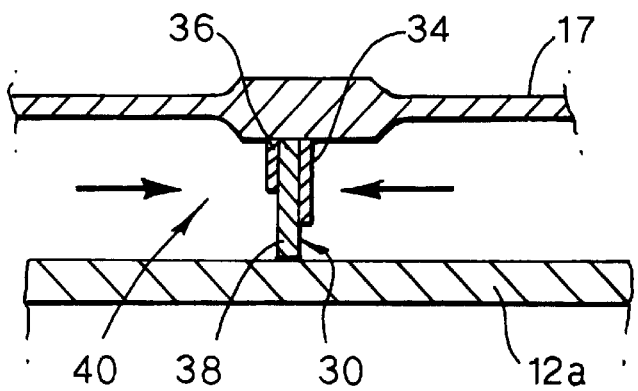
FIG. 2 is an illustration of a seal manufactured according to the invention in-situ within a gas turbine engine.
Figure 3:
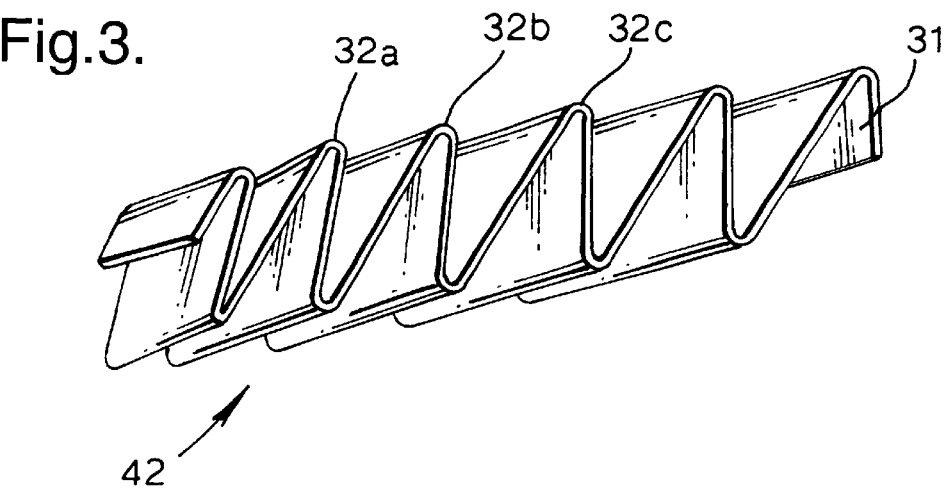
FIG. 3 is an illustration of the corrugated strip used in the manufacture of the seal.

With reference to FIGS. 2 and 3 the seal 30 comprises an elongate metallic strip 31 which has been folded into a corrugated strip 42 (FIG. 3) to form a multiplicity of corrugations 32a, 32b, 32c etc. The folded edges on one side of corrugated strip are attached to a support member and the opposite or free ends of the corrugations are removed so as to form individual leaves 38 of the correct size for the sealing gap 40 between the components to be sealed.

The axis of the corrugations is set at an angle to the axis of the annular member the clearance (or leakage) gap to which is to be sealed and also at an angle to a radial line taken from the centre of that axis.

Figure 4:
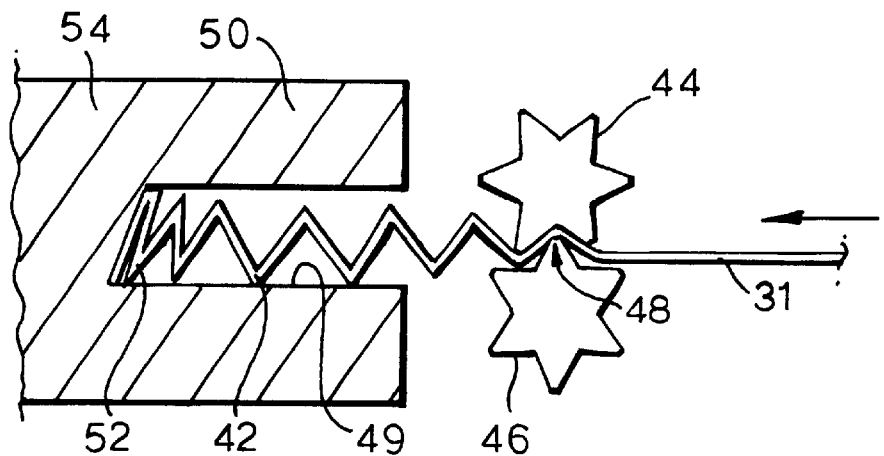
FIG. 4 is a schematic view of the apparatus used in the manufacture of a seal.

Referring now to FIG. 4 the seal is manufactured by producing a fan-folded or corrugated strip 42 from the planar metallic strip 31 The strip 31 is fed through meshed, and suitably shaped, wheels 44,46 which form the fold points of the corrugated strip 42. Basically the wheels 44,46 are star-shaped, the teeth are triangular in side view and the wheels are positioned and arranged so that, as they rotate, the teeth mesh together. Thus, when the elongate strip 31 is introduced between the rotating star-shaped wheels 44,46 it is progressively stepped forward and folded alternately at intervals spaced apart by the surface length of the teeth. The manner of folding first in one direction and then in the opposite at intervals is often referred to as fan-folding.

The wheels 44,46 are disposed on parallel axes spaced apart by the appropriate distance. The wheels are driven in an appropriate manner by a drive means, not show. For example, both wheels may be driven in synchronism. Alternatively only one of the wheels may be powered with the other free to rotate so that it is driven by reason of its meshing with the first wheel.

The corrugated strip 42 on emerging from between wheels 44,46 is then fed into a slot 49 formed in a guide block 50 of a suitable shape and size to accommodate the folded strip 42 whereby both ends of the corrugations 52 54 abut the guide walls. The guide 50 is manufactured to control the final shape of the strip and for easy removal of the strip 42.

Figure 5:
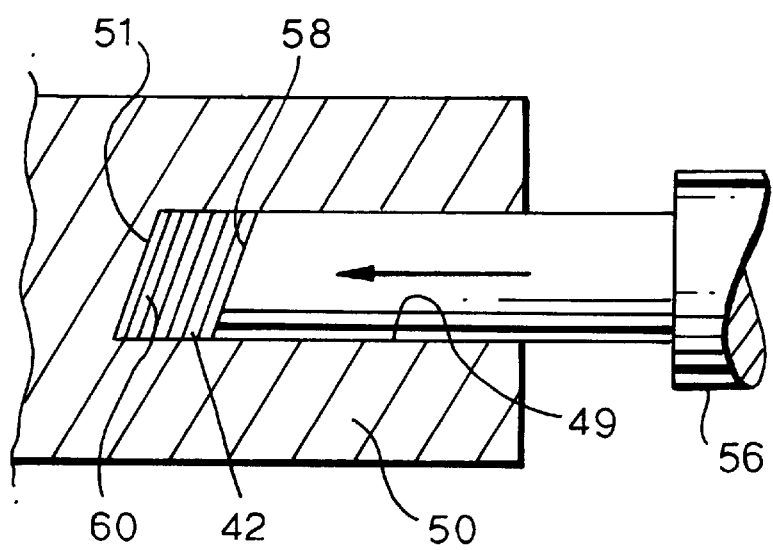
FIG. 5 is an illustration of the apparatus used in the manufacture of a seal.

Once a complete strip is positioned in the guide slot 49 by the feeding motion of the linked gears 44,46, a press ram 56 is employed to reduce the radius of the folds to a controlled size and set the angle of the corrugations as required, see FIG. 5. The distal end 58 of the press ram 56 and the blind end wall 51 of guide slot 49 are therefore formed at an oblique angle to the side walls of the slot 50 as to provide the desired angle of corrugations.

Figure 6:
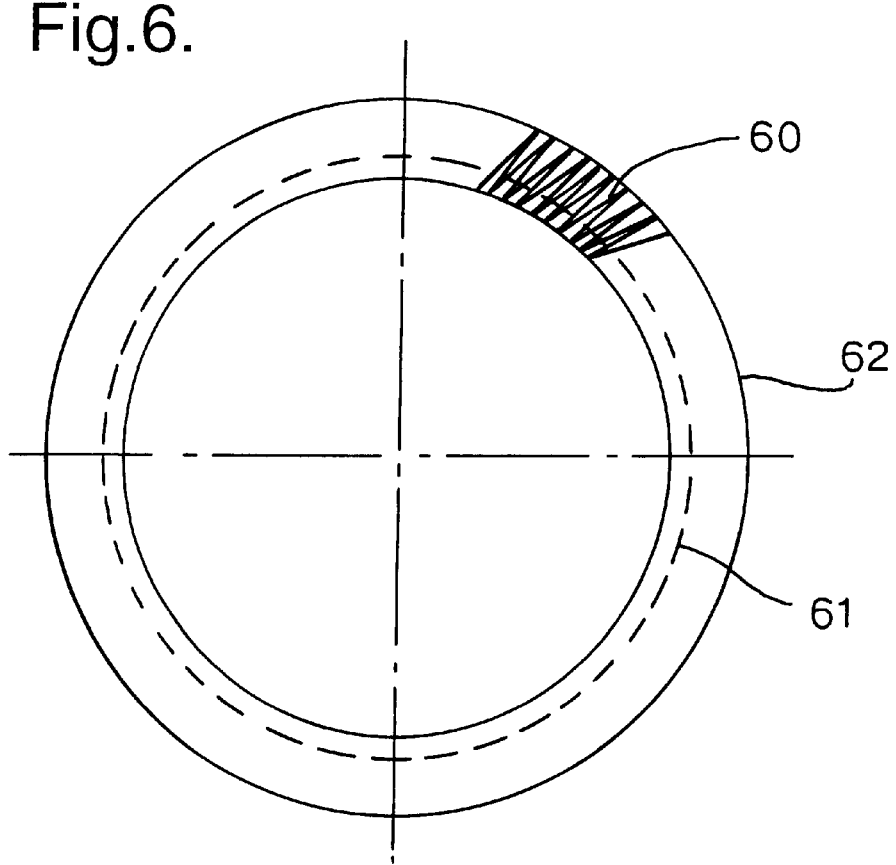
FIG. 6 is a cross section through a seal carrier containing a corrugated sealing strip manufactured according to the invention.

Referring now to FIG. 6 the seal segment 60 comprising a section of folded strip is provided in which each folded length constitutes a seal leaf form the press ram 56 and the angle of lay is also predetermined by the angle of the press ram 56. These characteristics of the corrugated segment 60 may therefore be accurately formed to meet required sealing specifications. The radii of the folds are a controlled small size and as small as possible to ensure the final leaves of the leaf seal 24 are close together.

Figure 7:
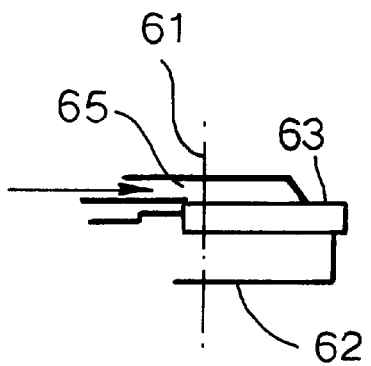
FIG. 7 is a side view of the seal during the cutting step of the present invention.

FIGS. 6 and 7 indicate the cut line 61 of the corrugated seal segment required to form the final seal 30. The corrugated strip is welded at 63 at the outer circumference, or alternatively at the inner circumference, while held in a fixture and clamped into position by clamp 65, or suitable alternative, during the machining/cutting process.

In one embodiment of the invention, in the above described method the corrugated strip forms a segment 60 of a seal in which a number of such segments 60 are employed to form a completed leaf seal 24. Said segment being positioned end to end within a suitable annular groove 62 formed in an assembly fire. The slot 49 in the guide 50 may be fully or partially of circular configuration so that the pressed segments 60 are pre-formed to the correct radius for mounting in the annular groove 62 of the assembly fixture. The guide block 50 may comprise the assembly fixture, thus avoiding a transfer step and a seal backing ring or carrier may be located in the groove 62 so that the segments 60 can be welded directly to the ring leaving only the opposite ends of the seal leaves to be trimmed.

The fixture 62 comprises annular side plates 34, 36 a corrugated strip is welded around the periphery to permanently fuse the folded leaves together in the annular form. The inside or outside diameter is then cut using a cup grinding wheel, a wire cutter, water or laser jet to finish to the required length.

Advantageously the need for the manufactured and subsequent stacking of individual leaves has been alleviated. The manufacture of corrugated strips comprising closely packed angled corrugations is less time consuming and the final machining step provides a the 'individual leaves' of the seal in a straightforward machining operation.

What is claimed is:

1. A method of manufacturing a leaf seal suitable for use within a clearance between two components comprising by the steps of:
    a) providing a strip of seal material,
    b) forming corrugations within said strip,
    c) feeding said strip into guide means,
    d) pressing said corrugated strip into said guide means by angled ram means such that the corrugations lie at an acute angle to the perpendicular axis,
    e) securing said corrugated strip in a seal carrier; and
    f) cutting the free ends of the corrugations thus forming angled leaves of a leaf seal.

2. A method according to claim 1 further characterised by the step of providing a plurality of corrugated strips positioned end-to-end within a seal carrier thus forming a continuous annular leaf seal.

3. A method according to claim 1 further comprising the step of providing said guide means with side walls and wherein said guide means is of annular configuration.

4. A method of manufacturing a leaf seal according to claim 1 wherein folds for the corrugations are formed by feeding said planar strip between geared wheels.

5. A method of manufacturing a leaf seal according to claim 1, wherein the folds on one side of the corrugated strip are attached to a carrier ring to form the seal and the folds on the opposite side of the corrugated strip are cut to form the individual leaves of the leaf seal.

6. A method according to claim 2 further comprising the step of providing said guide means with side walls and wherein said guide means is of annular configuration.

7. A method of manufacturing a leaf seal according to claim 2 where in folds for the corrugations are formed by feeding said planar strip between geared wheels.

8. A method of manufacturing a leaf seal according to claim 3 where in folds for the corrugations are formed by feeding said planar strip between geared wheels.

9. A method of manufacturing a leaf seal according to claim 2, wherein the folds on one side of the corrugated strip are attached to a carrier ring to form the seal and the folds on the opposite side of the corrugated strip are cut to form the individual leaves of the leaf seal.

10. A method of manufacturing a leaf seal according to claim 3, wherein the folds on one side of the corrugated strip are attached to a carrier ring to form the seal and the folds on the opposite side of the corrugated strip are cut to form the individual leaves of the leaf seal.

11. A method of manufacturing a leaf seal according to claim 4, wherein the folds on one side of the corrugated strip are attached to a carrier ring to form the seal and the folds on the opposite side of the corrugated strip are cut to form the individual leaves of the leaf seal.

* * * * *